United States Patent

[11] 3,599,582

| [72] | Inventor | Goran Emil Lagstrom<br>Essingeringen 72C, Stockholm, Sweden |
|---|---|---|
| [21] | Appl. No. | 814,321 |
| [22] | Filed | Apr. 8, 1969 |
| [45] | Patented | Aug. 17, 1971 |
| [32] | Priority | Apr. 19, 1968 |
| [33] | | Sweden |
| [31] | | 5302/68 |

[54] CENTRAL HEATING SYSTEM
4 Claims, 1 Drawing Fig.

[52] U.S. Cl. ...................................................... 110/9
[51] Int. Cl. .................................................... A47k 11/02
[50] Field of Search........................................... 110/9, 10;
4/131; 122/2

[56] References Cited
UNITED STATES PATENTS

| 372,305 | 11/1887 | Engle ............................ | 110/10 |
| 3,103,017 | 9/1953 | LaMere......................... | 110/9 X |
| 1,758,505 | 5/1930 | Epstein.......................... | 122/2 |

Primary Examiner—Kenneth W. Sprague
Attorney—Stevens, Davis, Miller & Mosher

ABSTRACT: A central heating system in which the combustion chamber of the system also constitutes the combustion chamber of a nonflush-type toilet, in which waste matter is destroyed by combustion.

PATENTED AUG 17 1971
3,599,582
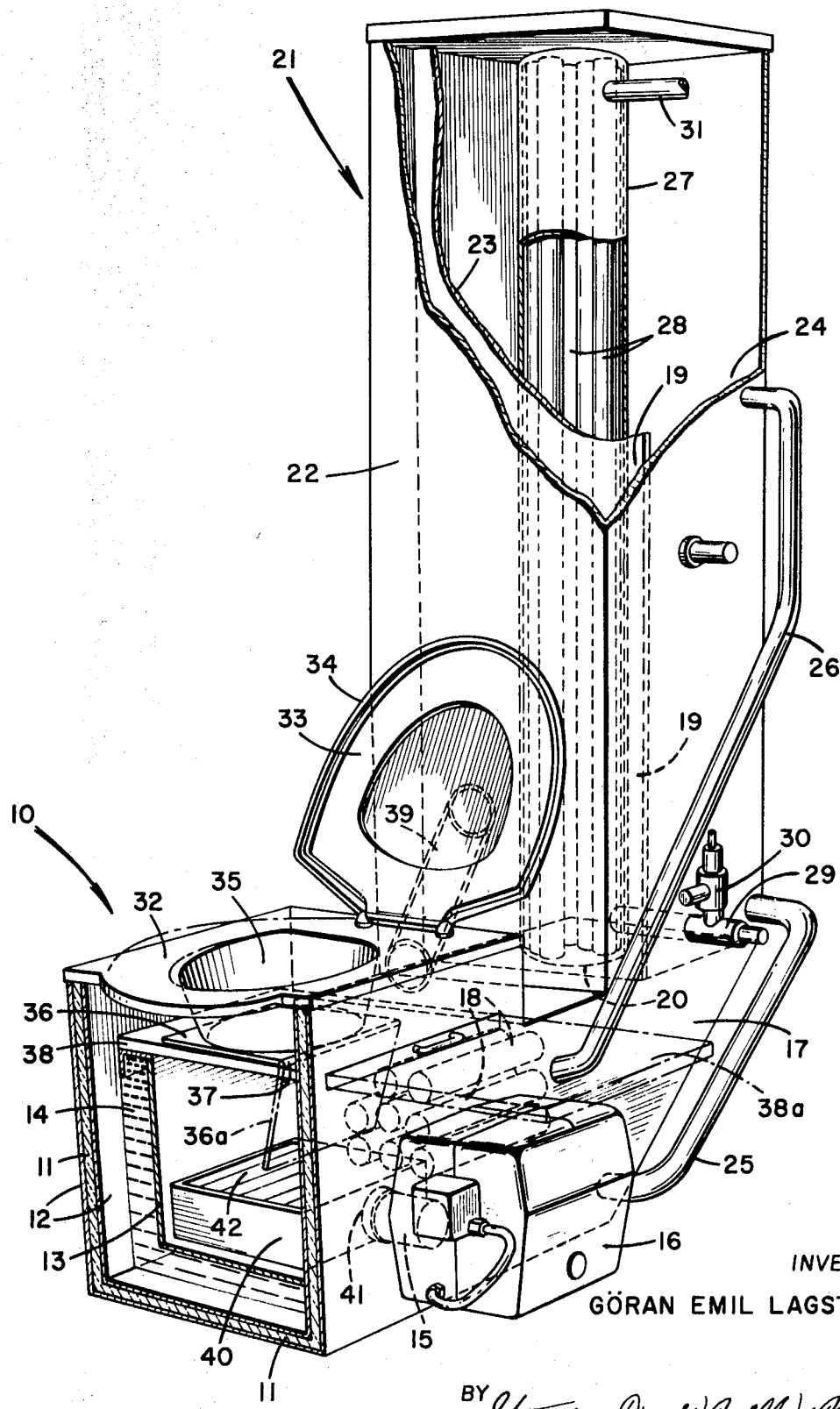
INVENTOR
GÖRAN EMIL LAGSTRÖM
BY Stevens, Davis, Miller & Mosher
ATTORNEYS

CENTRAL HEATING SYSTEM

The present invention relates to a central heating system, and more specifically to small-scale central heating systems which include a furnace or chamber for combustion and a heat exchanger contacted by hot gases from the combustion chamber and forming part of the liquid circulation circuit of the system.

It has long been desired to install in small dwelling houses and weekend cottages and the like central heating systems whose dimensions and fuel consumption are adapted to the general requirements. Those attempts which have been made in this regard, however, have resulted in relatively uneconomic systems, inter alia, because the dimensioning of the burner is considerably obstructive when adapting the fuel consumption to the actual requirements, i.e. the fuel needed solely to heat the building and for hot water purposes. Irrespective of the manner in which attempts are made to control the periods of combustion and the on and off frequencies for the source of combustion it is impossible to avoid wasting expensive heat calories. A theoretical efficiency of 90 percent is reduced to an annual average efficiency of about 50 percent. Consequently, the concept of the invention is to find a source of additional heat requirements over and above the heat used to heating the building and for hot water purposes so that the heat which would otherwise be wasted in such systems can be utilized economically. In this connection, thought has been given to the long acute problem of removing feces from toilets, particularly in such areas which have no organized water and sewage system.

In accordance herewith the invention is mainly characterized in that at least a portion of the combustion chamber simultaneously constitutes the combustion chamber of a modified dry toilet, i.e., a toilet of the nonflush type.

By using such an arrangement to dispose of feces and the like the energy surplus at disposal in the system is utilized in an economic manner simultaneously as additional heat is obtained from the burning feces and, moreover, the heat balance in the system as a whole is surprisingly improved and odorless gases are obtained, in contradistinction to those released from, for instance, an electric toilet, and at an incomparable low cost. Electrically produced heat calories in the home are ten times more expensive than heat calories produced by oil combustion.

The invention will now be described in more detail with reference to an embodiment thereof illustrated in the accompanying DRAWING, further characterizing features of the invention being disclosed in conjunction therewith.

The DRAWING shows a perspective view, partly cut away, of a central heating system of the invention having a combustion chamber which simultaneously compress a combustion chamber in a combustion-type toilet.

The drawing illustrates a parallel epipedic box generally indicated at 10 and constructed with metal walls. The box, the front wall of which in the drawing is cut away to illustrate the interior of said box, is coated externally with a suitable insulating material 11, which is covered by protective plates 12. Arranged within the box 10 is a further box 13, which is disposed to form a water jacket 14 therebetween. A tubular lead-in 15 is arranged between the two boxes and in which the burner tube of one oil or gas burner 16 is inserted, in the lower portion of the combustion chamber formed by box 13. As can be seen from the drawing, the box 10 is extended rearwardly to form a rear stack fume chamber or the like 17, which communicates through the intermediary of a number of stack fume tubes 18, which are tubular in the exemplary embodiment, with the combustion chamber 13, so that fumes from the latter are able to flow through the tubes 18 out into the collecting space 17, to which is connected a vertical fume passage 19 having a lower opening 20. The fume passage forms part of vertical casing, generally indicated at 21, the front wall 22 of which forms one defining surface of the passage, and an internal vertical plate 23 forming the opposite defining wall of said fume passage. It is assumed that the fume passage 19 at the upper portion of the casing 21 is connected to a chimney or other form of fume-conducting passage.

The casing, divided by plate 23, presents a chamber 24 filled with water and communicating via syphon tubes 25 and 26 with the water jacket 14. This water system is intended for central heating purposes. Arranged within the chamber 24 is a closed warm water heater generally indicated by 27 and which is throughpassed by a number of stack fume tubes 28, which discharge at the bottom into the stack fume chamber 17 and at the top into the chimney or the like (not shown). The hot water heater is connected in a known manner to a fresh water source 29 having a safety valve 30 and a hot water outtake 31.

In the aforegoing are described the essential members of a central heating system particularly suited to small dwelling houses, but which nevertheless can be used in other locations to the same advantage.

As will be seen from the drawing, the system can also be utilized in combination with a toilet of the type in which feces are combusted. In the exemplary embodiment the combustion chamber of the central heating system simultaneously forms a combustion chamber in a dry toilet, said toilet substantially consisting of a basin 35, a basin-seat portion 32, a toilet seat 33 and a cover lid 34. The lower opening of the toilet basin is provided with a hinged plate 36 mounted by means of hinges 37 at the lower portion of said basin. Extending in guides immediately beneath the hinged plate 36 is a shield 38 made of heat-resistant and heat-insulating material. The shield 38 can be drawn out to the position indicated with chain lines at 38a, the arrangement being such that the plate 36 falls down when the shield is withdrawn and is reclosed when the shield is inserted. The shield insulates the combustion chamber 13 from the basin portion of the toilet. The basin portion of the toilet also communicates by an ejector tube 39 with the stack fume passage 19, so that when the cover lid 34 is lowered and the shield 38 withdrawn any upwardly flowing fumes are effectively removed by suction.

For the purpose of collecting feces and the like in the combustion chamber 13, there is placed on the bottom thereof an ash box 40 made of heat-resisting and corrosion-resisting material. Disposed in said box at a distance from the bottom thereof is an opening 41 which permits passage of the burner flame. At the top of the ash box is arranged a grid 42 to receive solid waste products which fall when the hinged plate 36 is dropped to the position 36a. Urine is collected on the bottom of the ash box, from which it is evaporated and completely chemically converted to an odorless gas during its passage through the combustion zone. The solid waste products are also combusted rapidly and effectively by the high combustion temperature in the flame and fumes of combustion, and the ash consequently occupies but a small volume. The toilet is emptied by lifting the ash box, subsequent to withdrawing the shield and lifting the seating portion of the basin. The toilet according to the invention is also provided with means which automatically break the current to the burner when the shield 38 is withdrawn.

Owing to the fact that the burner flame projects between the bottom of the ash box and grid, the flame will not be extinguished in the event of large quantities of falling waste products, paper or the like.

In the exemplary embodiment, the whole of the combustion chamber is used as a combusting portion of the toilet. It is within the scope of the invention, however, to use only a limited portion of the combustion chamber of the central heating system for the actual toilet. In accordance with the invention, the cover lid may also be interlocked with the movable shield if desired, so that the shield can only be withdrawn when the lid is dropped.

The invention is not restricted to the shown and described embodiment thereof, but can be varied within the scope of the following claims.

What I claim is:

1. In a combined water-heating system and incinerator, a boiler cooperating with means for circulating heated boiler water within the system and returning said water to the boiler, a combustion chamber in said boiler, at least part of which combustion chamber is in the form of an incinerator, an intermittently operating burner adapted to heat the combustion chamber, means arranged in the zone of burner activity for receiving waste matter fed to the incinerator, wherein the incinerator is in the form of a nonflush toilet having a toilet basin opening directly into the combustion chamber, a toilet seat and lid connected to said basin, a hinged, freely movable flap positioned beneath and covering the discharge opening of the toilet basin, a manually operated retractable heat-shielding means arranged beneath said hinged flap support in position beneath said opening to cover said opening and to release said flap upon being retracted, said heat-shielding means also being adapted to shield the occupant of said basin from the heat of combustion, burner power supply shutoff means interconnected with said heat-insulating shield in a manner whereby the power supply to said burner is interrupted when the shield is moved from its shielding position.

2. In a combined water-heating system and incinerator according to claim 1 wherein the means for receiving waste material is an ash box having a grid at the top thereof and side openings through which a burner flame can be inserted to burn the contents of said box.

3. In a combined water-heating system and incinerator according to claim 1, wherein the waste material receiving means is mounted on the bottom of the combustion chamber and wherein means are provided whereby said waste material receiving means can be readily removed from and replaced into said combustion zone.

4. In a combined water-heating system and incinerator according to claim 1, wherein at least part of the water-heating system is in heat exchange contact with a central heating system.